United States Patent [19]

Wood

[11] Patent Number: 4,768,410
[45] Date of Patent: Sep. 6, 1988

[54] CODED WEB AND ASSOCIATED WEB HANDLING AND WORKING MACHINE

[75] Inventor: Kenneth O. Wood, Ellington, Conn.

[73] Assignee: Gerber Scientific Products, Inc., Manchester, Conn.

[21] Appl. No.: 927,742

[22] Filed: Nov. 5, 1986

Related U.S. Application Data

[62] Division of Ser. No. 778,146, Sep. 20, 1986, Pat. No. 4,708,901.

[51] Int. Cl.⁴ .................. B26D 5/20; B26D 5/40; B26D 5/30
[52] U.S. Cl. .................................. 83/63; 83/71; 83/370; 83/371; 235/489; 235/494
[58] Field of Search .................... 83/71, 63, 370, 371; 235/494, 489; 33/18.2; 346/139 B

[56] References Cited

U.S. PATENT DOCUMENTS

| | | | |
|---|---|---|---|
| 2,124,906 | 7/1938 | Bryce | 235/494 |
| 3,668,957 | 6/1972 | Nido | 83/71 |
| 3,696,738 | 10/1972 | Walker | 33/18.2 |
| 3,868,877 | 3/1975 | Shoji et al. | 83/371 |
| 4,467,525 | 8/1984 | Logan et al. | 33/18.2 |
| 4,506,824 | 3/1985 | Bartz | 83/71 |

Primary Examiner—E. R. Kazenske
Assistant Examiner—Scott A. Smith
Attorney, Agent, or Firm—McCormick, Paulding & Huber

[57] ABSTRACT

An elongated sheet of web material has a longitudinal row of feeding holes in each side edge portion and a plurality of binary codes longitudinally spaced along one side edge portion; and an associated web handling and working machine has sprockets which cooperate with the feeding holes to feed the web, a tool or other instrument for working on the web and a device for reading the codes as the web is fed through the machine. Each code comprises a group of data bits and provides such information as the remaining length of web available to be worked upon, the type of instrument suitable to work on the web, and whether the instrument should be rotated to maintain it tangent to its path of travel over the web.

8 Claims, 5 Drawing Sheets

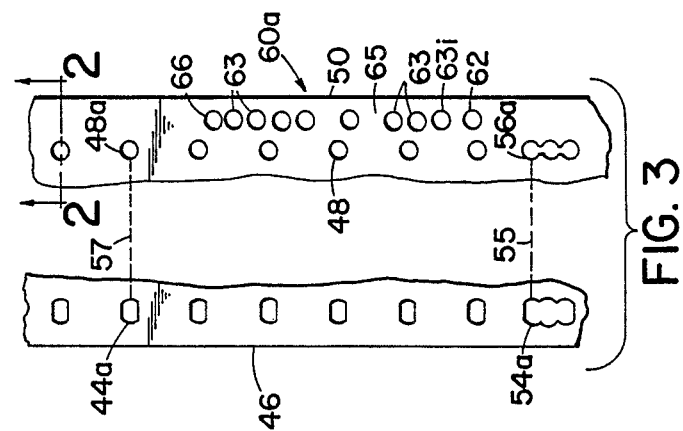
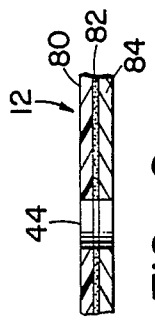
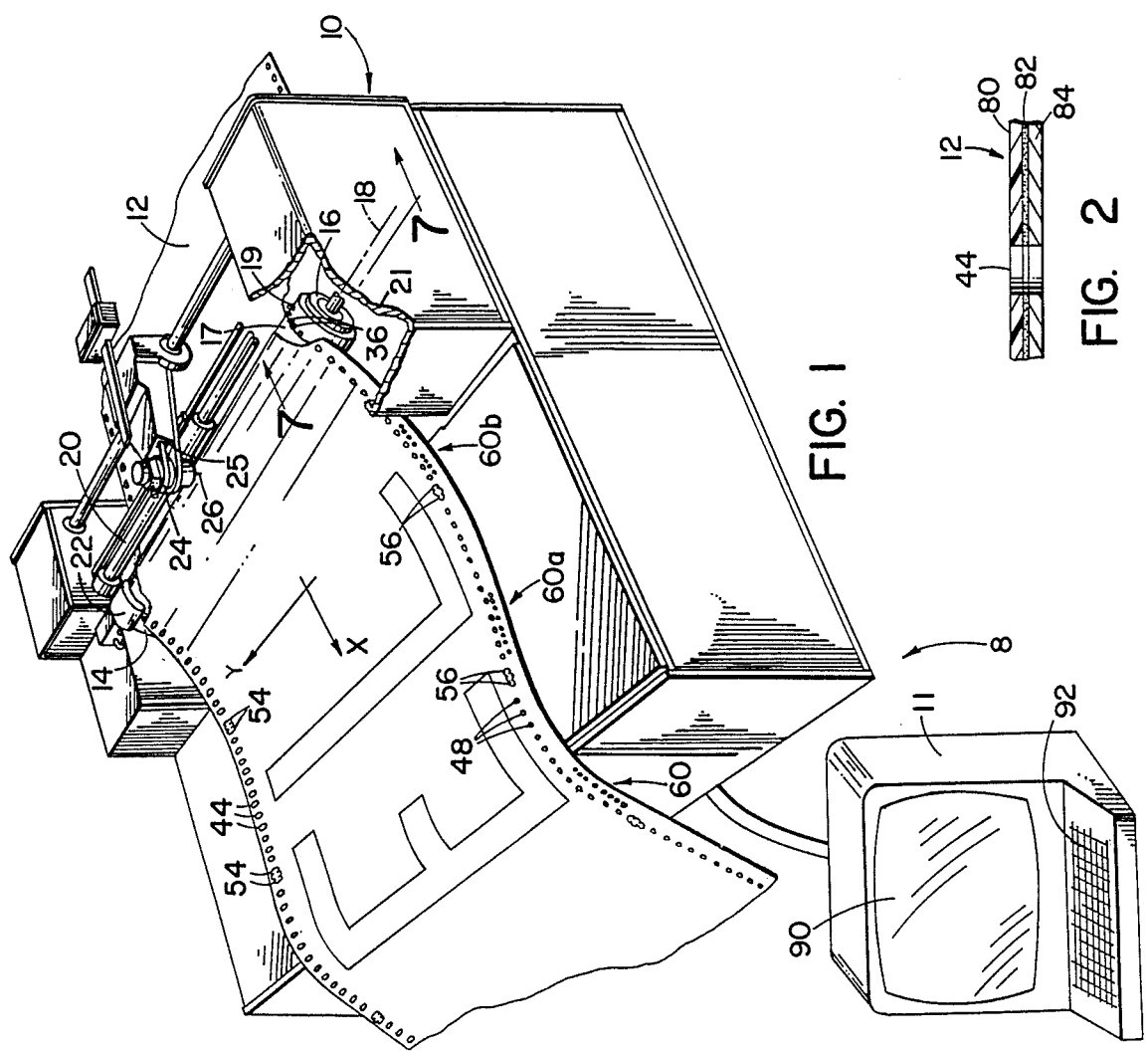

CODED WEB AND ASSOCIATED WEB HANDLING AND WORKING MACHINE

This is a divisional of co-pending application Ser. No. 778,146 filed on Sept. 20, 1986, now U.S. Pat. No. 4,708,901.

BACKGROUND OF THE INVENTION

The invention relates generally to a web and an associated web handling and working machine which feeds the web longitudinally of itself and works on the web as it is fed to generate a graphic on the web. The invention deals more particularly with a code on the web which the machine reads as the web is fed, the code providing such information as the length of the web remaining for use.

The present invention may be used with any one of various types of machines such as a plotting machine, a recording machine or the signmaking machine described in U.S. Pat. No. 4,467,525 to Logan, issued on Aug. 28, 1984, assigned to the assignee of the present invention and hereby incorporated by reference as part of the present disclosures. The sign making machine works on sign making web stock which is stored as a roll and drawn by a pair of feed sprockets having pins which cooperate with rows of holes in two side edge portions of the web.

Information describing a desired sign pattern such as an alphanumeric inscription or a geometric shape is programmed into the machine to cause it to automatically cut the pattern from a continuous length of the web. It is important that enough web remain on the roll to make such a pattern before the machine begins to cut it because the machine may not be equipped to continue cutting a pattern on a fresh roll if the previous roll is short, in which case the cut portion of the previous roll is wasted. In this machine and others, a machine operator is usually required to estimate, by visually observing the roll, whether enough web remains to make the desired pattern. However, when little web remains on the roll and the desired pattern is long, the estimation may be inaccurate.

Furthermore, the signmaking machine described above and other web working machines may handle a variety of types of webs and may operate with various types of instruments, and it is important that the proper instrument be utilized for the particular web being fed and that the instrument be operated in the proper manner. For example, the sign making machine is often used to plot a sign pattern on a paper web before the relatively expensive sign making stock is cut, in which case it is important that the operator install a plotting tool within the machine and apply the proper weight, if any, needed to develop a requisite stylus pressure.

After an operator is satisfied with the plot of the desired sign, he or she substitutes signmaking stock for the paper web and selects a suitable cutting instrument. For most types of signmaking stock, a knife blade is required in which case it is important that the operator program the signmaking machine to maintain the blade tangent to the line of cut.

The operator typically relies upon his or her memory, written instructions or trial and error to select the proper instrument and stylus pressure weight and, if a cutting blade is required, to program the machine to maintain the blade tangent to the line of cut. However, errors occur.

Accordingly, a general aim of the invention is to provide a web handling and working system which reduces errors of the foregoing types.

A more specific aim of the invention is to provide a web handling and working system including a coded web and a web handling and working machine capable of reading the code, which code includes such information as the length of the web remaining on the roll, the type of instrument suitable to work on the web, the weight if any required to develop a suitable stylus pressure, and/or if a knife blade is utilized, the fact that the instrument should be maintained tangent to the line of cut.

Another specific aim of the present invention is to provide a coded web for a web handling and working machine of the foregoing type.

Other aims and advantages of the invention will become apparent from the following detailed description of the preferred embodiments and the accompanying drawings.

SUMMARY OF THE INVENTION

The invention resides in an elongated web and a web handling and working machine which feeds the web longitudinally through it. The web includes a code which is readable by the web machine, which code provides such information as the length of web remaining for use, the type or types of instruments which are suitable to work on the web, a weight, if any, required to develop a requisite stylus pressure and/or, if a knife blade is suitable, the fact that the blade should be maintained tangent to the line of cut.

In one aspect of the invention, the web has binary codes spaced periodically along the length of the web in a side edge portion.

BRIEF DESCRIPTION OF THE FIGURES

FIG. 1 is a perspective view of a web handling and working system including a sign making machine and a web which system embodies the present invention. Various portions of the machine and the web are broken away to reveal additional features.

FIG. 2 is an enlarged scale, fragmentary sectional view of the web taken on the plane 2—2 of FIG. 3.

FIG. 3 is an enlarged scale, fragmentary plan view of the web of FIG. 1.

DETAILED DESCRIPTION OF THE PREFERRED EMBODIMENT

Figure 4:
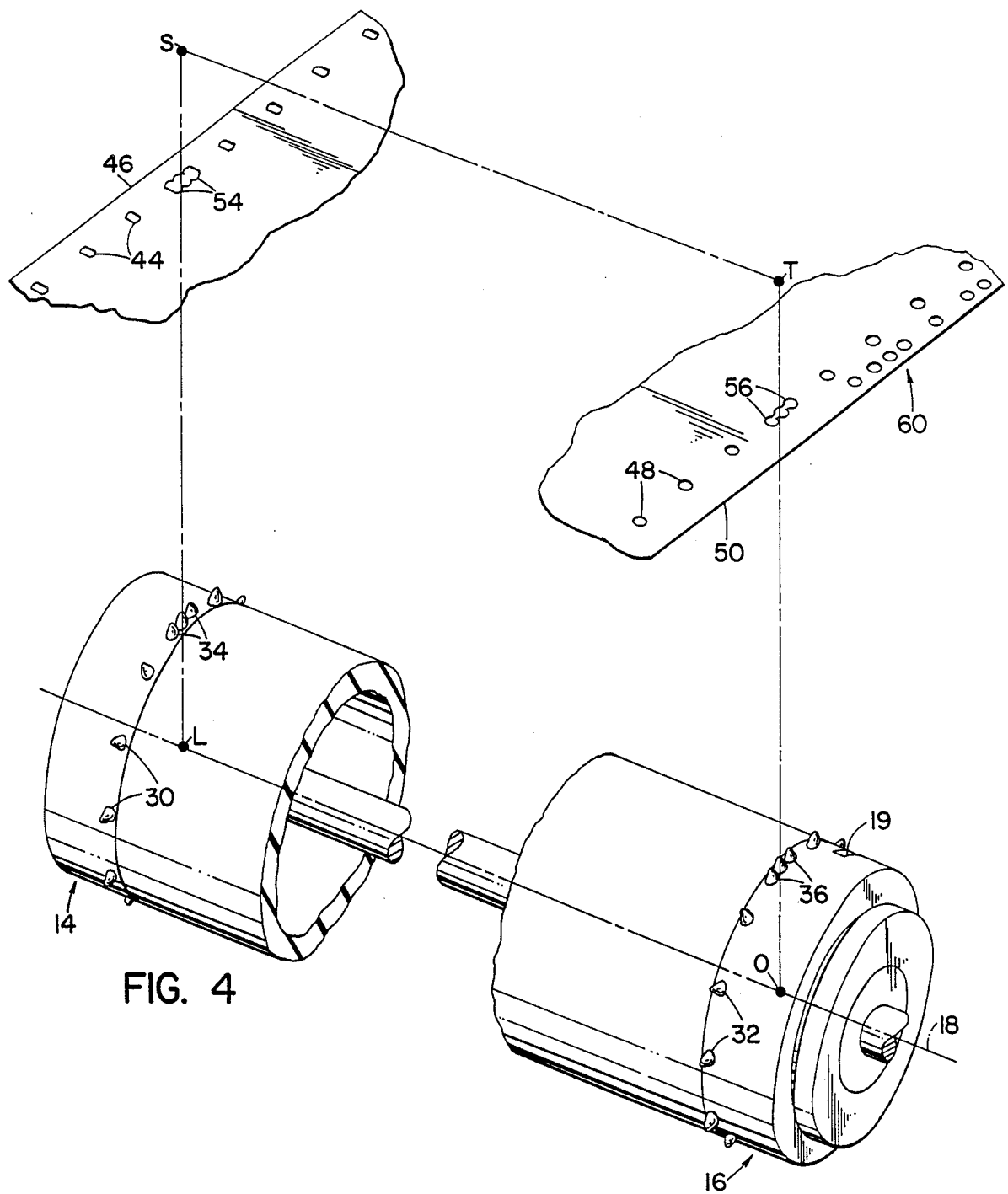
FIG. 4 is a fragmentary perspective view showing the relationship between the sprockets and the web of FIG. 1 during the loading of the web.

Referring now to FIG. 1, the invention is there illustrated as embodied within a web handling and working system 8 which includes a sign making machine 10 and an associated web 12. The machine 10 is of the type shown and described in more detail in the aforementioned U.S. Pat. No. 4,467,525 to Logan, et al. The web has feeding holes (classified below as driving holes and keying holes) in its side edge portions and is moved longitudinally of itself, in an illustrated X-coordinate direction, by a pair of feed members in the form of sprockets 14,16 which are supported for driven rotation in unison about a common drive axis 18 and have pins or teeth which engage the holes. A platen or roller 17 located between the two sprockets 14 and 16, and similar to that of a typewriter, supports a transverse portion of the web 12 aligned with the sprockets 14, 16 and has a window 19 through which the web is scanned. The machine 10 further includes two web holddown bails 22 (FIG. 1) and 23 (FIGS. 5, 6 and 7) for the sprockets 14 and 16, respectively, the bail 23 being pivotally mounted to a side portion 21 of the machine 10 and positioned over the portion of the platen 17 which contains the window 19. The bails normally hold the web in engagement with the sprockets as the web is fed and, in addition, the bail 23 has an aperture 69 which receives an optical scanning device discussed in more detail below.

As further illustrated by FIG. 1, the machine 10 also includes a head 24 supported on a movable carriage 25 and suitably driven in an illustrated Y-coordinate direction relative to the web 12. With the motion of the tool head 24 in the Y-coordinate direction and the feeding of the machine 10 in an illustrated X-coordinate direction, the web is able to cut patterns of most any shape from the web 12. Such cut patterns are later transferred to a sign base to form a finished sign.

In a normal sign making mode of operation, the tool head 24 is equipped with a knife-type cutter or blade 26 and the web 12 is an elongated piece of sign making stock which, in this case, is opaque. FIG. 2 shows such sign making stock having an upper layer 80 from which the patterns are cut and a carrier layer 84. The upper layer is typically made of thermoplastic material such as vinyl on the order of three to five mils thick with an adhesive backing or coating 82 which releasably attaches the upper layer 80 to the carrier layer 84. The carrier layer consists, for example, of ninety-pound paper coated or impregnated with silicone to give it the release property.

The machine 10 also is operable in a plotting mode during which a pen, pencil or other plotting tool is placed in the tool head 24 instead of the blade 26 and a webbed sheet of paper or the like is fed through the machine. The purpose of plotting mode is to check the accuracy of the information entered into the machine before the more expensive sign making stock is cut. In both the sign making mode and the plotting mode, the machine 10 operates automatically once the web is loaded and the tool is installed to produce the desired plot or pattern as the case may be. Also, a sensor (not shown) is provided within the tool head to sense the type of instrument which is installed and to notify the computer of such.

The web 12 is loaded on the sprockets 14 and 16 so that as the web is moved longitudinally of itself by rotation of the sprockets, lines extending laterally of the web, that is, perpendicular to its side edges, are parallel to the sprocket axis 18. Typically, the web 12 is wide, for example, nine inches, relative to the spacing between the holes formed in each side edge portion of the web which, for example, are on one-half inch centers. Because of the large width of the web relative to the spacing of the holes, the web is provided with distinctive keying holes 54,54 and 56,56 interspersed with driving holes 44,44 and 48,48, respectively and the sprockets are provided with distinctive keying pins 34,34 and 36,36 (FIG. 4) interspersed with driving pins 30,30 and 32,32, respectively to identify which holes in each side edge portion of the web should be placed over which pins on each sprocket to align the web with the sprocket axis.

As indicated by lines 55 and 57, respectively, in FIG. 3 which are perpendicular to side edges 46 and 50 of the web, the keying hole 54 indicated as a is laterally aligned with the keying hole 56 indicated as a and the driving hole 44 indicated as a is laterally aligned with the driving hole 48 indicated as a. To properly load the web 12 onto the sprockets 14 and 16, the sprockets are first turned to a web loading position at which position the keying pins face upwardly. Then, the web is positioned over the sprockets such that the keying holes 54,54 are located directly above the keying pins 34,34 and the keying holes 56,56 are located direction above the keying pins 36,36 as indicated by plane LSTO passing through the sprocket axis 18. Finally, the web 12 is lowered onto the sprockets. The holes 44,44 and 54,54 in one side edge poriton of the web are laterally elongated to accommodate the pins 30,30 and 34,34 despite variations in web width due to variations in temperature or humidity or manufacture tolerance. For a further description of such a web, reference may be made to U.S. patent application, entitled "Web Loading and Feeding System", filed same day herewith by Kenneth Wood, David Logan and John LaDue and hereby incorporated by reference as part of the present disclosure.

Focusing now on the present invention as illustrated by FIGS. 3 and 4, the web 12 includes binary codes 60,60. In the illustrated embodiment, the codes take the form of holes punched into the side edge portion of the web outboard of the holes 48,48 and 56,56. However, it should be clearly understood that the codes may take other forms such as graphic inscriptions. The codes 60,60 occur periodically along the length of the web 12 as shown in FIG. 1 and, in the illustrated embodiment, occur once per set of keying holes 56,56. However, the codes need not occur so often and may, for example, occur once for every other set of keying holes.

The codes may also occur at a spacing unrelated to the location or spacing of the keying holes, for example, adjacent every tenth driving hole in a web having thirteen driving holes per keying hole. Each code 60 in the web 12 occurs approximately at a fixed location relative to a respective keying hole 56, the imprecision in code location being due to the effects of temperature and humidity on the web material and on manufacture tolerance. Each binary code 60 includes a guard hole 62, binary data bits and a parity bit 66. Each of the data bits takes one of two possible forms, a hole 63 representing one binary level or a solid, unpunched portion 65 of the web representing the other binary level.

Figure 5:
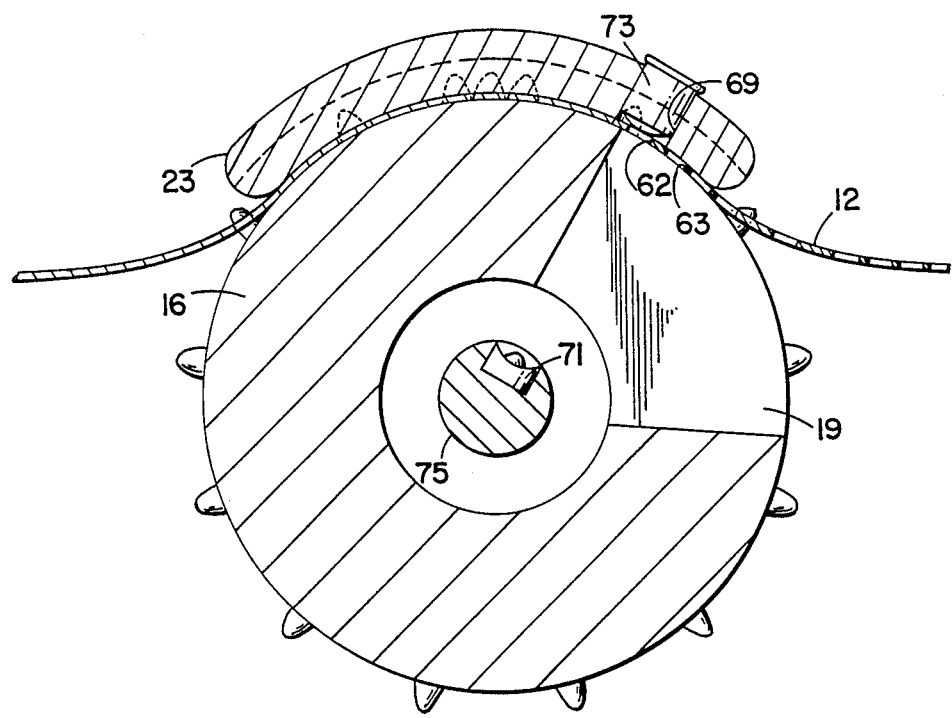
FIG. 5 is a sectional view taken on the line 5—5 of FIG. 7 of one of the sprockets of FIG. 1, an associated bail which is included in the machine of FIG. 1 but omitted from FIG. 1 and an associated set of optical scanning elements.
Figure 6:
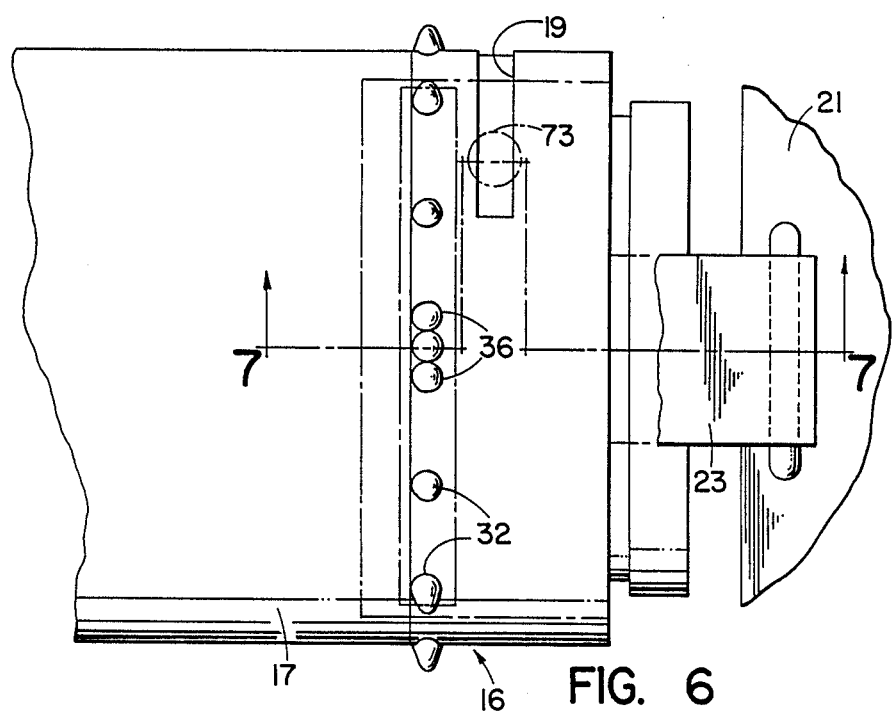
FIG. 6 is a top plan view FIG. 1 which is adjacent the sprocket of FIG. 5.
Figure 7:
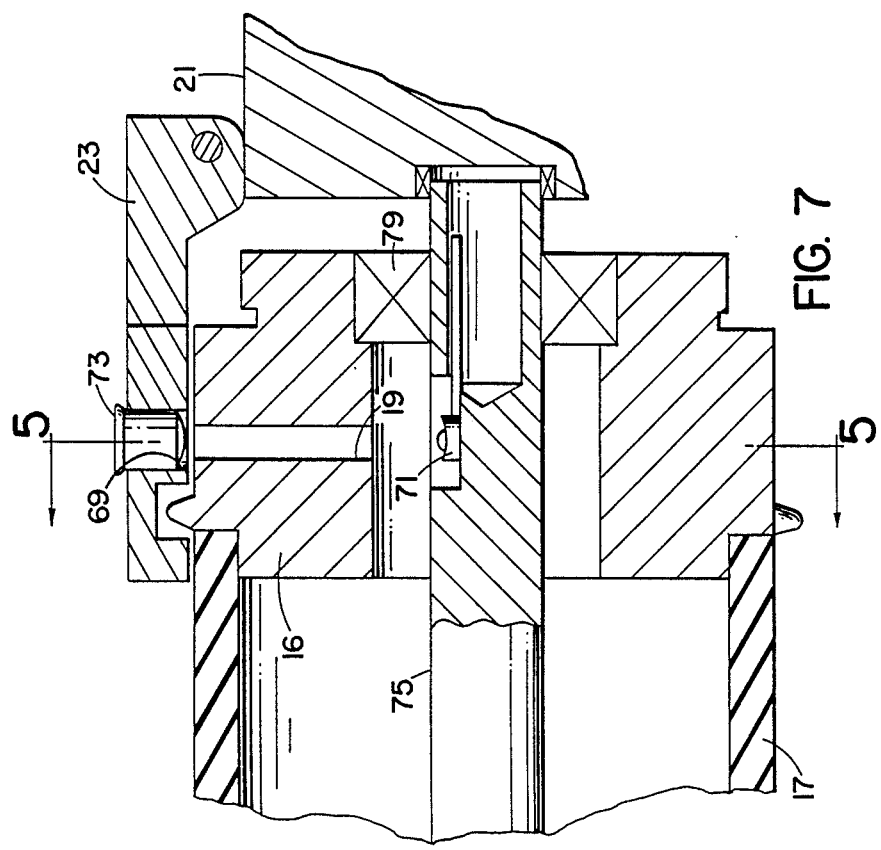
FIG. 7 is a fragmentary, sectional view of the unfragmented machine of FIG. 1 taken along the line 7—7 of FIG. 1. (Each of the FIGS. 5, 6 and 7 shows the sprocket in the same angular orientation.)

As shown in FIGS. 5-7, the code 60 is read when it passes over the window 19 by an optical scanning device comprising a source of light or light emitting element 71, for example, a continuously illuminated incandescent bulb situated within the platen 17, and a light sensitive or receiving element 73, for example, a light sensitive diode (LSD) or a photo conductive element such as Type 9 CDS manufactured by Gilway Corporation, situated within the aperture 69 in the bail 23. However, it should be noted that there are other ways to read the codes 60,60, for example, by aiming air jets at them and sensing where the air passes through the web or by engaging the codes 60,60 with spring loaded fingers whose extended position triggers a respective switch and sensing where the fingers extend through the web. The light source 71 is mounted on a shaft 75 which shaft and light source 71 are stationary and which light source is positioned to radiate light towards the light sensitive element 73. The platen 17 rotates about the shaft 75 by means of a bearing 79 and the light passes through the window 19 and towards the light sensitive element when the window is positioned above the light source 71 as is the case in FIGS. 5-7. The machine 10 also includes a stepping motor (not shown) under the control of the computer by which the platen is driven, and from its control, the computer determines the angular position of the platen 17 and so the angular position of the window 19 and the sprocket 16. Because the codes 60,60 occur approximately at fixed locations relative to respective keying holes 56,56, and the keying holes 56,56 are engaged by the drive sprocket 16 when the sprocket 16 and the platen are located at known angular positions, the computer is able to calculate the approximate time of arrival of each code over the window 19. When the computer calculates that the beginning of code 60 is soon to arrive underneath the light sensitive element 73, the computer begins to sense the output of the light sensitive element 73. When the guard hole 62 is situated directly underneath the light sensitive element 73, (as is the case if FIG. 5), the light radiated from the light source 71 passes through the window 19 and the guard hole 62 and is received by the light sensitive element 73. Hence, the computer learns the precise location of the code 60. Another reason that the machine 10 searches for the guard hole 62 is because some webs which may be read by the machine 10 do not have a code adjacent each set of keying holes, and the guard hole informs the computer as to the existence of a code to be read.

Because the computer sensed the guard hole 63, it again senses the output of the light sensitive element 73 when the sprocket and platen have been rotated by the stepping motor amount corresponding to the separation distance between the guard hole 62 and the leading data bite, i.e., when the leading data bit has advanced to a position directly underneath the light sensitive element 73. In FIG. 3 this leading data bit is shown to be a hole 63i, but depending on the code it could also be an unpunched portion 65. Therefore, in the FIG. 3 case, light passes through the initial data bit 63i and is sensed by the light sensitive element 73 and, in turn, by the computer. This process is repeated for each data bit 63,65; however, the light sensitive element 73 is now sensed at intervals corresponding to the separation distance between data bits. It should be noted that when a solid data bit 65 appears at the sensing station, light radiated from the light source 71 is blocked by the opaque web material and does not reach the light sensitive element 73 which fact is sensed by the computer also. Finally, the computer performs the light sensing process for the parity bit 66 to check the validity of the code data bits 63,65.

The number of data bits 63,65 included in each code 60 depends on the type and amount of information required from it. At least some of the data bits are commonly used to indicate the length of the web remaining on the roll, and, for example, if the roll of web is 150 feet long and the keying holes and codes are placed every six inches, then each binary code 60 requires at least 300 binary levels and, therefore, at least nine data bits (ten shown in the Figures). For this application, the codes 60,60 when read in sequence, indicate progressively shorter and shorter lengths of web material available to be worked upon. For example, the code 60 indicated as b in FIG. 1 indicates a shorter web length than the code 60 indicated as a, the web being fed in the illustrated X-direction and the code 60b being read after the code 60a.

In addition, one or more data bits may be used or binary levels of the original nine data bits which are not needed to indicate the remaining web length may be delegated to provide the following information: the type of web material which is currently loaded; the type or types of instruments which are suitable to work on the web, for example, a pencil or pen if the web is made of paper or a knife blade if the web is made of signmaking stock; and if a knife blade is suitable, the fact that the blade must be rotated to maintain it tangent to the line of cut. Also, if desired, the code may include bits providing information as to the proper weight, if any, needed to develop a suitable stylus pressure.

Figure 8:
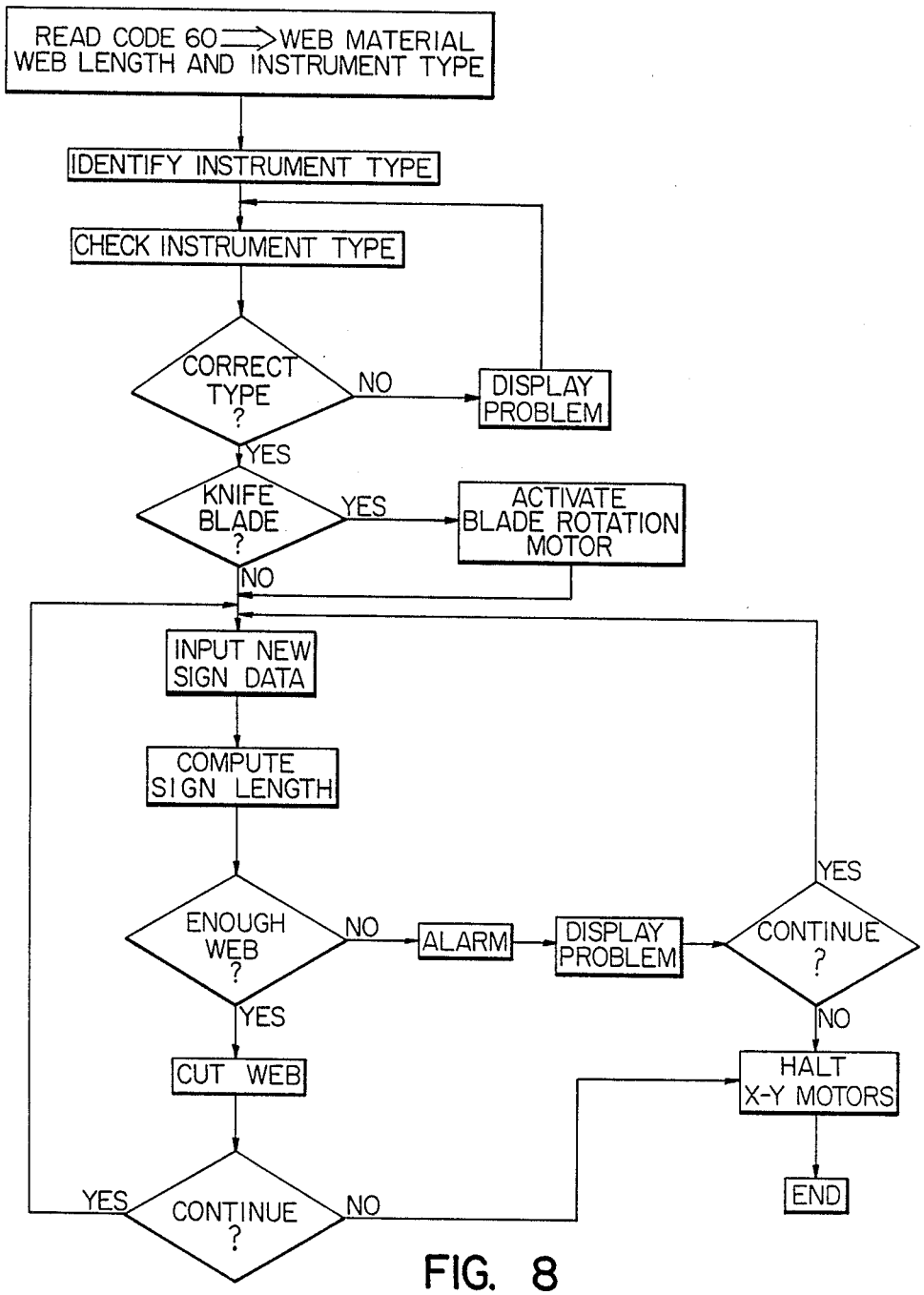
FIG. 8 is a flowchart indicating the process by which the web handling and working machine of FIG. 1 utilizes information obtained from codes on the web.

The information provided by each code is or may be displayed on a monitor 90 to instruct an operator how to operate the machine 10 and also is or may be used directly by the computer 11 to automatically operate the machine 10 in an appropriate manner. The flow chart of FIG. 8 illustrates one process for utilizing such information. The computer 12 first reads the code 60 and learns the length of the web remaining and the type of tool which is suitable to work on the web. In the illustrated case, the web is signmaking stock and the computer is informed that a knife blade is suitable. Then, the computer senses the type of tool which is installed in the tool head 26 by means of the sensor described above and if the tool is not a knife blade, the computer displays the problem on the monitor 90 and loops until the proper tool is installed. When the knife blade is installed, the computer proceeds to automatically activate the blade rotation motor to maintain the blade tangent to the line of cut.

At some time, usually after the web 12 is loaded, an operator inputs data into the computer via a keyboard 92 (FIG. 1) which data defines a sign pattern to be cut. From this data, the computer computes, among other things, the length of web required to produce the pattern. If there is insufficient web material remaining, the computer prevents the machine 10 from cutting the web, sounds an auditory alarm and displays the problem on the monitor 90. If there is enough web material remaining, the computer activates the X-Y motors and an actuator within the tool head 26 to cut the sign pattern.

Although not shown in FIG. 8, the code 60 also may include information as to the weight, if any, required to develop a suitable stylus pressure for the knife blade. Also, when the operator inputs the pattern data, he or she may also input information defining the type of web material from which the pattern should be cut and the computer can compare this information against that derived from the code 60 to determine if the proper web material has been loaded.

Figure 9:
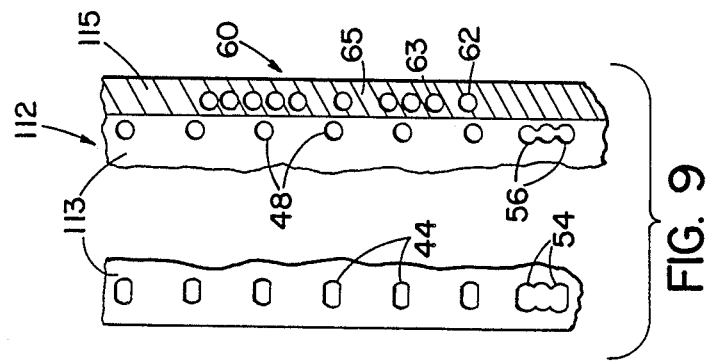
FIG. 9 is a fragmentary plan view of another web in which the invention is embodied.

FIG. 9 shows another web 112 embodying the invention, which web has the driving and keying holes 44,44, 48,48, 54,54 and 56,56 and the code 60 hole pattern of the web 12 and is identical to the web 12 except that the web 12 is opaque throughout whereas the web 112 is transparent or semi-transparent throughout a main portion 113 and is striped on a side edge portion 115 to make the side edge portion 115 opaque. The purpose of the opaque stripe on the web 112 is to block the path of the light radiated from the light source 71 when the light encounters a solid data bit 65 just as the solid portions of the opaque web 12 block the light radiated from the light source 71. Hence, the web 112 is readable by the machine 10 without modification to the machine.

By the foregoing, web handling and working systems, including coded webs and a code reading, web handling and web working machine have been disclosed. However, numerous modifications and substitutions may be made without deviating from the scope of the invention. For example, the shape of the holes in the code 60 may be made rectangular without detracting from the performance of the system.

Also, if desired, a web may be provided with a highly reflective carrier layer and binary codes inscribed with dark, nonreflective ink on the lower carrier surface of the web on a side edge portion. The inscribed code includes a guard bit, data bits and a parity bit and provides the same types of information as the code 60. To read such a code, the machine 10 is slightly modified to include a light sensitive element supported adjacent the light source 71 in fixed relation thereto and positioned to receive light reflected from reflective data bits but shielded from direct exposure to light radiated from the light source 71. The computer senses the output of this light sensitive element when it calculates the arrival of the code into the scanning path of this light sensitive element. The light sensitive element adjacent the light source may be installed in the machine 10 in addition ot the light sensitive element 73 to make the machine versatile enough to read either the punched or inscribed codes, the appropriate light sensitive element being activated by a manually operated switch.

It is also feasible to inscribe the codes with magnetic ink and read them by magnetically sensing them, or to use holography to read inscribed codes.

It is also possible to substitute a source of pulsing light such a ligh emitting diode (LED) for the incandescent light bulb 71. To read the code using the LED, the computer pulses the LED and senses the output of the light sensitive element 73 at times which correspond to the arrival at the sensing station of the guard hole 62, the data bits 63,65 and the parity bit 66. Because some types of webs exhibit slight variations in the code location relative to the keying holes 56,56 and therefore, slight variations in location relative to the angular orientation of the sprocket 16, the computer pulses the LED rapidly prior to the arrival of the guard bit 62, and when the first such pulse of light reaches the ligh sensitive element 73, the computer learns the starting point of the code. The computer times subsequent pulses from that point on in relation ot the angular advancement of the sprocket 16, i.e., at times corresponding to the calculated arrival of the data bits 63,65 and the parity bit 66 underneath the light sensitive element 73.

It is also possible to feed the web by means of two pairs of pinching rollers, one pair surrounding each side edge of the web. The rollers of each pair engage opposite faces of the web and are rotated in opposite directions, and thereby feed the web by frictional forces, the web feeding holes not being needed.

Therefore, the invention has been described by way of illustration and not limitation.

I claim:

1. A web handling and working machine for handling and working upon an elongated web for the purpose of creating a graphic on the web, the web having on it code means comprising a plurality of codes varying in content amongst each other and spaced from one another longitudinally along the web, each code including a plurality of data bits which collectively provide information defining at least the length of web remaining from the point on the web bearing the code, said machine comprising:
   means for feeding said web longitudinally of itself,
   means for inputting under the control of an operator information defining a graphic to be created on said web,
   an instrument engageable with said web for working on said web,
   means responsive to said graphic defining information for moving said instrument in a graphic generating program relative to said web to create the graphic defined by such information,
   means responsive to said graphic defining information for determining the length of web needed to create the graphic defined by such information,
   code reading means operable in advance of the start of said graphic generating program for reading one of said plurality of codes which lengthwise of said web is near said instrument, and
   means for comparing said length of web needed with said length of web remaining as provided by the code read by said code reading means and for providing an indication of whether such remaining length of web is sufficient for creating said graphic.

2. A web handling and working machine as set forth in claim 1 wherein,
   said means for feeding said web includes a platen which supports a transverse portion of said web, said platen having a window, and
   said code reading means comprises an optical device including a light emitting element and a light receiving element one of which elements is located within said platen and the other of which elements is located outside of said platen so that said codes are scanned by light from said light emitting element passing through said window.

3. A web handling and working machine as set forth in claim 1 wherein,
   said means for feeding said web includes a platen which supports a transverse portion of said web and a bail means for pressing said web against said platen, and
   said code reading means includes a device having a light emitting element and a light receiving element one of which elements is supported by said bail means.

4. A web handling and working system for creating graphics on a web, said system comprising:
   an elongated web,
   code means, integral with said web, for providing information about said web, said code means comprising a plurality of individual codes spaced from one another longitudinally along said web, each of said codes comprising a plurality of data bits which collectively provide information defining at least the length of web remaining from the point on the web bearing the code, means for feeding said web longitudinally of itself, means for inputting under the control of an operator information defining a graphic to be created on said web, an instrument engageable with said web for working on said web, means responsive to said graphic defining information for moving said instrument in a graphic generating program relative to said web to create the graphic defined by such information, means responsive to said graphic defining information for determining the length of web needed to create the graphic defined by such information, code reading means operable in advance of the start of said graphic generating program for reading one of said plurality of codes which lengthwise of said web is near said instrument, and means for comparing said length of web needed with said length of web remaining as provided by the code read by said code reading means and for providing an indication of whether such remaining length of web is sufficient for creating said graphic.

5. A web handling and working system as set forth in claim 4 wherein said elongated web has a longitudinal row of feeding holes in a side edge portion, and said means for feeding said web comprises a sprocket, said sprocket engaging said longitudinal row of feeding holes to feed said sheet.

6. A web handling and working system as set forth in claim 4 further characterized by:

said web having two side edge portions extending along the length thereof, said means for feeding said web including feed members cooperable with a first row of holes in one of said side edge portions of said web and a second row of holes in the other of said side edge portions of said web, the holes of both of said rows being spaced from one another along the length of said web, the holes of each of said rows including a plurality of feed holes and a lesser plurality of keying holes, said keying holes being spaced regularly from one another along the length of said web and there being a constant number of said feed holes appearing between each adjacent pair of said keying holes, each of said keying holes having associated with it a characteristic making it visually distinguishable from said feed holes, said keying holes of one of said rows appearing at the same positions along the length of said web as the keying holes of the other of said rows, said codes being located at positions spaced from one another along the length of said web by the same spacing as appears between said keying holes of each of said rows of holes.

7. A web handling and working system as set forth in claim 6 further characterized by:

said means for feeding said web further including a platen which supports a transverse portion of said web for working by said instrument, and said feed members being a pair of sprockets at opposite ends of said platen, said platen and said sprockets being supported for rotation in unison about an axis extending transversely of said web, said sprockets having pins engageable with said feed holes of said web for feeding said web longitudinally of itself in response to rotation of said platen and said sprockets about said transverse axis, said platen having a window, said means for reading said codes including a device including a light emitting element and a light receiving element one of which elements is located within said platen and the other of which elements is located outside of said platen so that said codes are scanned by light from said light emitting element passing through said window, and said sprockets also including means cooperable with said keying holes of said web to dictate a given placement relationship between said web and said sprockets, said given placement relationship being such that when said web is placed on said sprockets in accordance with said placement relationship each time one of said codes appears at said platen it is registered with said window.

8. A system for making signs of variable length, said system comprising:

a sign making machine for handling and working upon an elongated sign making web, and an elongated sign making web for use with said sign making machine, said sign making machine including a means for feeding said web longitudinally of itself along a given feed path, a tool for cutting a sign of variable length from said web, and a means providing information about a sign to be made by said sign making machine including the length of sign making web required for said sign, said sign making web including a plurality of codes carried by said web and spaced from one another longitudinally of said web, each of said codes including a plurality of data bits encoded to describe the remaining length of said web appearing between the position of that code on said web and one end of said web, said sign making machine also including reading means located along said feed path for reading each of said codes as said sign making web is moved past said reading means due to the feeding of said web along said feed path by said feeding means, said reading means and said tool being located at approximately the same position along the length of said feed path, means for comparing said length of web required for a sign with the remaining length of web as determined by said reading means, and means inhibiting the operation of said tool on said sign making web in the event said comparing means determine that the length of said web required for said sign is greater than said remaining length of web.

* * * * *